Figure 1:
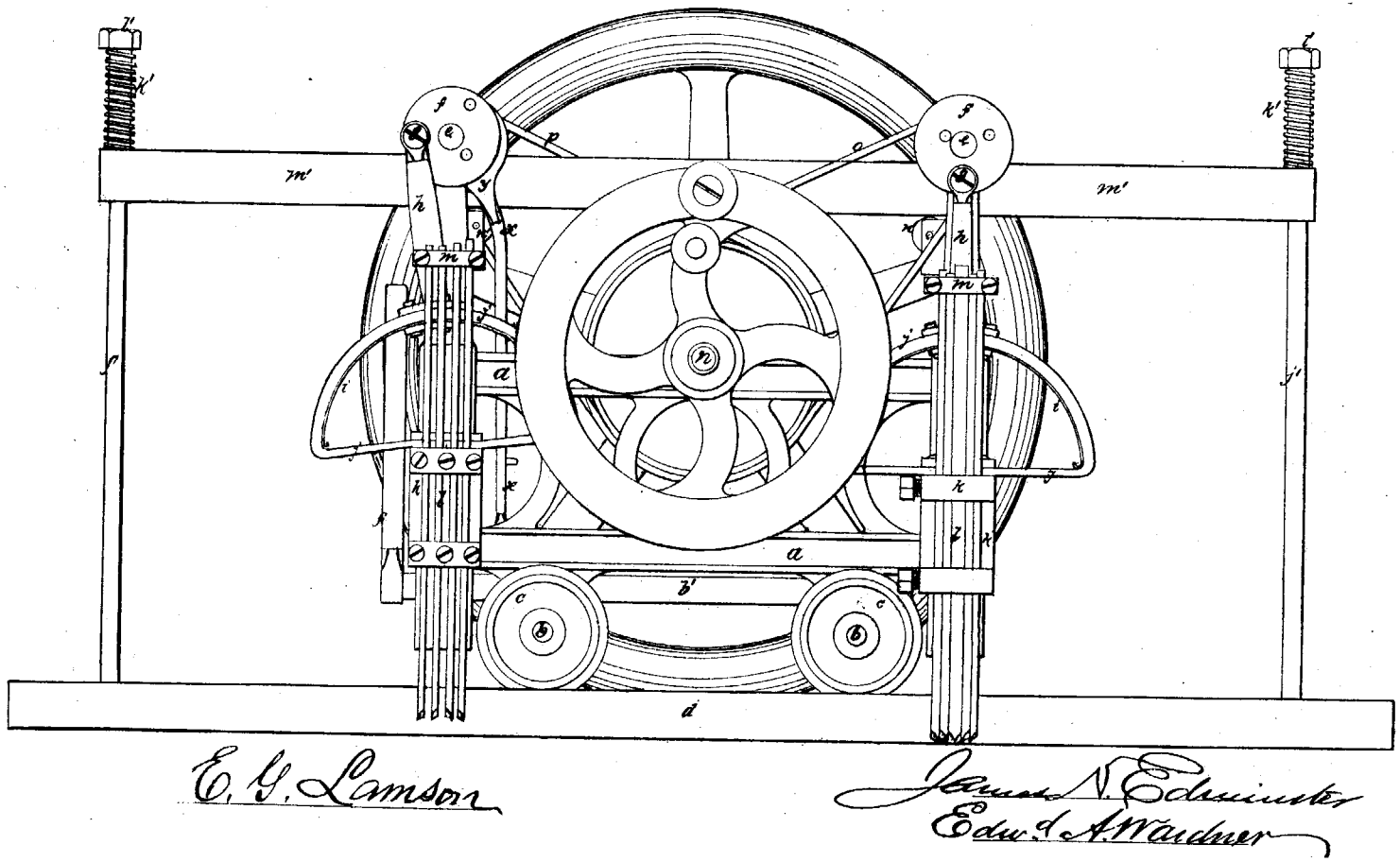

2 Sheets--Sheet 1.

E. G. LAMSON.

Improvement in Machines for Channeling Rock.

No. 4,407. Reissued May 30, 1871.

AM. PHOTO-LITHOGRAPHIC CO. N.Y. (OSBORNE'S PROCESS.)

2 Sheets--Sheet 2.
E. G. LAMSON.
Improvement in Machines for Channeling Rock.
No. 4,407.
Reissued May 30, 1871.
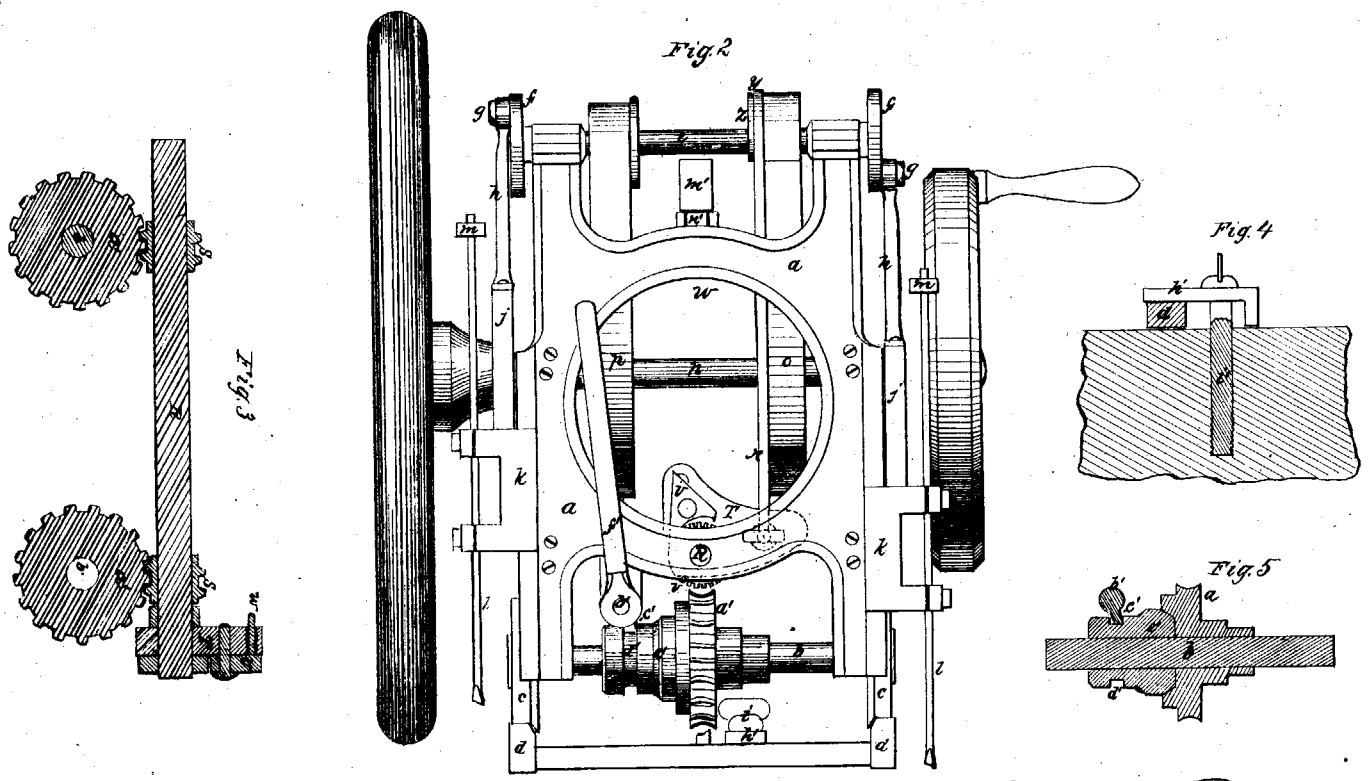
James S. Schumacher
Edw. A. Wardner
E. G. Lamson
AM. PHOTO-LITHOGRAPHIC CO. N.Y. (OSBORNE'S PROCESS.)

UNITED STATES PATENT OFFICE.

EBENEZER G. LAMSON, OF SHELBURNE FALLS, MASSACHUSETTS, ASSIGNOR TO THE WINDSOR MANUFACTURING COMPANY, OF WINDSOR, VERMONT.

IMPROVEMENT IN MACHINES FOR CHANNELING ROCK.

Specification forming part of Letters Patent No. 58,435, dated October 2, 1866; reissue No. 3,366, dated April 13, 1869; reissue No. 4,407, dated May 30, 1871.

*To all whom it may concern:*

Be it known that I, EBENEZER G. LAMSON, of Shelburne Falls, in the county of Franklin and State of Massachusetts, have invented certain new and useful Improvements in Machines for Channeling Rock in Quarrying; and I do hereby declare that the following is a full, clear, and exact description of the same, reference being had to the accompanying drawing making part of this specification, in which—

Figure 1 represents an elevation of one of the sides of the machine, the opposite side being substantially similar to that shown in this figure. Fig. 2 represents an elevation of one of the ends of the machine. Fig. 3 represents a section through the feeding mechanism. Fig. 4 represents the manner of clamping the ways or track, upon which the machine moves, to the stone or rock to be wrought upon. Fig. 5 represents a section through one of the friction-clutches that connect with the feed mechanism.

Similar letters of reference, where they occur in the several figures, denote like parts of the machine in the drawing.

It has been found essential in machinery for channeling rock in quarries to arrange the gangs of chisels, and the stocks to which they are attached, and the machinery for operating them, in a frame adapted to travel on suitable ways or rails, to guide the machinery as it travels along, to enable the gangs of chisels to cut or form the required channel and to travel back and forth in the same channel until the required depth is obtained.

To cut channels in rock by automatic machinery with more economy and efficiency than by hand chisels or drills, it is necessary to work gangs of chisels and to strike the rock with more force than can be given by hand; and as the required depth of channel can only be obtained by successive operations the machine must move accurately, that the gangs of chisels may, in the repeated operations, work freely in the same channels. Such machinery, of necessity, must be heavy, and so heavy as not to be lifted from the ways on which it travels by the force of the blows when the chisels strike the rock, and if not sufficiently heavy to resist the force of the blows it would be necessary, by suitable means, to hold the machinery down to the ways. To operate the chisels by a positive and unyielding reciprocating motion would not only subject the machinery to destructive violent jars, but, as rock is frequently of unequal hardness, in striking the more refractory parts the machinery would very soon be broken.

To avoid the difficulties above enumerated, and others not necessary to mention, prior to my said invention the gangs of chisels, with the stocks to which they were attached, were simply lifted by the mechanism and then permitted to fall so as to strike the rock by the force of gravity, assisted at the first start of the downward motion by the force of a spring contracted by the lifting motion, and although the jars due to the fall of the parts were necessarily of great weight to strike the rock with efficient force, still, by this mode of operation, the chisels were self-adapting to the varying hardness of the rock.

This mode of operation, however, was seriously defective. The downward motion, being due to gravity, slightly aided by springs, was unavoidably slow, and, being slow, the force of the blows could only be increased by increasing the weight of the parts, with all the disadvantages of increased force of the jars so destructive of machinery.

By my said invention I have successfully overcome the defects inherent in the mode of operation of machinery previously known and used for this purpose; and the first part of my said invention consists in combining the following mechanisms, viz: The stock, with its chisel or chisels, adapted to slide in suitable guides; a crank on a rotating shaft, or equivalent device, for imparting a positive reciprocating motion to a connecting-rod or equivalent device; a spring, interposed between the chisel-stock and the connecting-rod; and a feeding mechanism, all mounted in a frame adapted to move on ways, by means of which combination, as the machine is moved along the line of the intended channel, the chisels to make the successive cuts are self-adapting to the surface of the rock in which they are required to make the successive cuts by reason of the interposed spring, while, at the same time, the reciprocating motion is imparted to them by the positive motion of a revolving crank or equivalent device, by reason of which the chisels can be operated at any desired velocity irrespective of the force of gravity, so that the force of the blows can be increased by increasing the velocity, the yielding of the spring at each of the reciprocoting motions of the chisels thereby so far reducing the jars that, if desired, a boiler and engine as the motor can be mounted in the same frame; and my said invention further consists in combining, with the combined mechanism above stated as constituting the first part of my said invention, the connection of the spring with the chisel-stock by straps or equivalent, by means of which the amount of play of the chisel-stock beyond or within the range of the positive motion of the crank is greatly increased, so that the chisel or chisels receive the impetus for the downward cut from the crank while passing the horizontal plane of its axis, and hence, when moving at its greatest velocity in a downward direction, the yielding of the spring, and the increased play, due to the strap or link, preventing their downward impetus from being checked by approach of the crank to its dead-point.

In the accompanying drawing, *a* represents a suitable frame mounted on the axles *b b* of flanged wheels *c c*, fitted to run on a track, *d*. In the upper part of the frame *a* are mounted two horizontal shafts, *e e*, one near each end, and each provided with two crank-wheels, *f f*, one at each end, which wheels are provided each with a crank-pin, *g*, the throw of which can be varied, if desired, by being shifted to holes in the crank-wheel at different distances from the axis of rotation. To each crank-pin is fitted one end of a connecting-rod, *h*, the lower end of which is connected with the crown of a bow-spring, *i*. A strong strap, *j*, extends over the outside of the bow-spring and around under the ends thereof, and then inward, the two ends being firmly secured to a block of metal, *k*, adapted to slide up and down in vertical guides. The gangs of chisels *l l* are secured in the block *k*, and, if desired, may be further secured by a clamp, *m*, at or near their upper ends. Two such gangs of cutters are represented on each side of the frame, one near each end. The two shafts *e e* may receive motion from one main driving-shaft, *n*, by belts *o* and *p*; or they may receive motion in any other suitable manner, and, if desired, from a steam-engine mounted in the same frame, the jars being so much reduced by my invention as to admit of mounting a steam-engine and boiler on the same frame with the rest of the machinery. To the lower or under part of the frame, and at or near the middle of its length, is placed a shaft, R, which has two worm-gears, *s s*, upon it; and upon this shaft, also, there is loosely placed an arm, T, which arm has upon it a double pivoted pawl, U, that works in a ratchet-wheel, *v*, fastened on said shaft R, said pawl being capable of working on either side of the shaft and of being held in its adjusted and, for the time being, working position, or in a neutral position when it is desired by this means to stop feeding, by a spring-bolt, *w*, or by any other suitable device. The arm T is vibrated on the shaft R by a rod, *x*, connected to it, the upper end of which rod is attached by a yoke, *y*, to an eccentric, Z, on one of the shafts *e*. This rod *x* can be adjusted on the arm T, as shown by dotted lines in Fig. 2, so as to vary the motion of the arm, and consequently the pawl that moves (through certain parts to be presently described) the machine along on its tracks or ways. On the axles *b b* are placed the gears *a′ a′*, into which the worms *s* upon the shaft R work, and by which these axles and their wheels are turned, and the whole machine moved steadily along on its track and in the direction for which the pawl U may be set. A second shaft, *b′*, is placed at the under side of the machine and parallel with the one R, and has upon it projections *c′*, which take into grooves *d′* made in a sleeve or semi-clutch, *e′*, that moves longitudinally on a spline on each one of the shafts or axles *b* by means of the lever *f′* on one end of said shaft. The gears *a′ a′* are loose on the axles *b*, and their hubs are dished or hollowed out, as seen in Fig. 5, and the end of the semi-clutch *e′* turned off to fit said dished or hollowed-out portion. When the semi-clutch is jammed into the gears *a′ a′* the gears, axles, wheels, and the entire machine will move regularly on the way or track; but if the semi-clutch *e′* be moved away from the recesses in the gears by turning the shaft *b′*, the machine will remain stationary. Thus the machine may be fed along in either direction or stopped, while the cutters or chisels continue to work.

By means of clamps *h′* and screws *i′* the track *d* is held down firmly to the rock or stone that is to be worked, and if found necessary the machine may be still further held to the work by rods *j′ j′*, extending upward from the track, and holding, by springs *k′* and nuts *l′*, to a horizontal bar, *m′*, that bears upon friction-rolls *n′* on the machine, and thus holds it to the work without undue friction to impede its motion back and forth on the track.

Full-sized machines will have weight enough to hold themselves steadily against the working of the cutters. Lighter machines may not have.

The circular openings *w* in the ends of the frame are to show how a steam-boiler with an engine attached may be supported and carried along with the machine so as to be very compact and very efficient.

I contemplate the use of this machine for channeling the pavements of streets where, from use, they have become so smooth as to prevent horses from drawing heavy loads without liability of falling and of great injury to themselves.

What I claim as my invention, and desire to secure by Letters Patent in machinery for channeling rock, is the combination of the following mechanisms or devices, viz:

1. The sliding stock with its chisel or chisels, the crank on a rotating shaft or its equivalent, the connecting-rod or equivalent device, a spring interposed between the chisel-stock and the connecting-rod, and the feeding mechanism or equivalent, all mounted in a frame adapted to move on ways, substantially as and for the purpose specified.

2. In machinery for channeling rock, the combination of the sliding stock with its chisel or chisels, the crank on a rotating shaft or its equivalent, the connecting-rod or equivalent device, a spring and strap or its equivalent interposed between the connecting-rod and chisel-stock, and the feeding mechanism or equivalent, all mounted in a frame adapted to move on ways, substantially as and for the purpose specified.

E. G. LAMSON.

Witnesses:
ALBERT K. POST,
R. L. JONES.